July 26, 1938.    J. H. JOHNSON    2,124,822
ARTIFICIAL FISH LURE
Filed Dec. 14, 1936
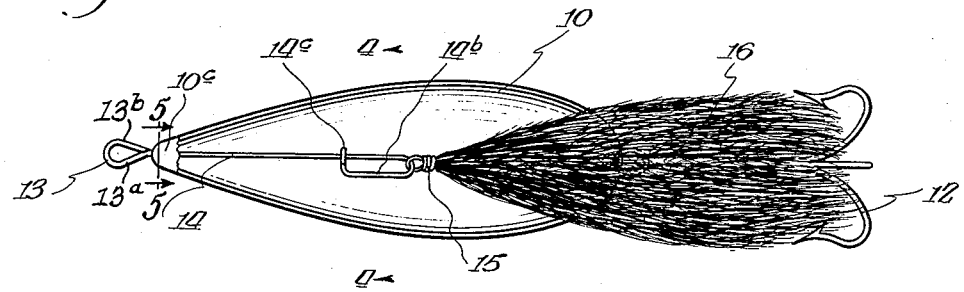
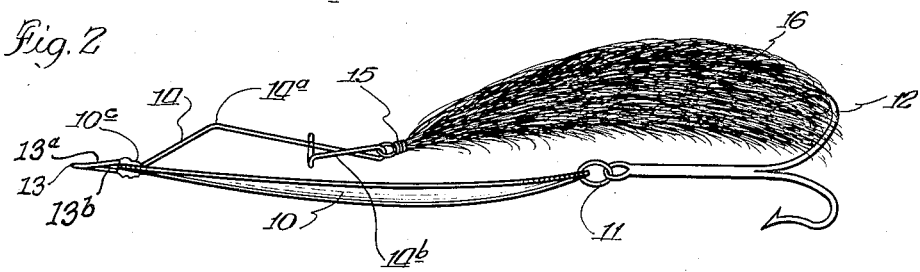
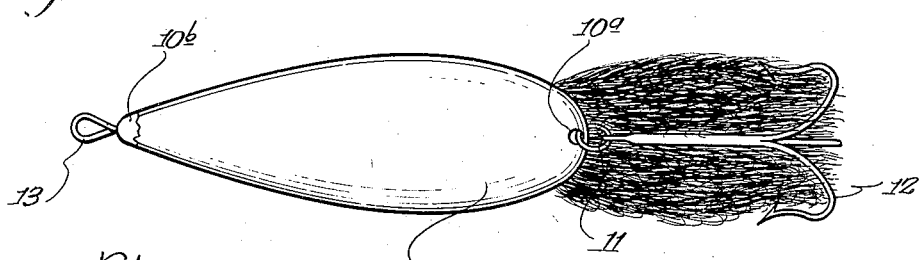
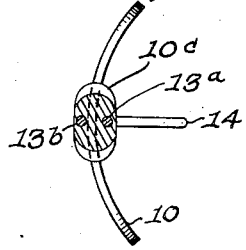
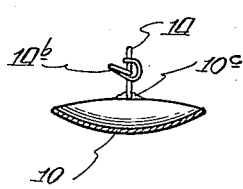
Inventor:
John Harvey Johnson.
By: Milo B. Stevens & Co.
Atty's.

Patented July 26, 1938

2,124,822

UNITED STATES PATENT OFFICE 2,124,822

ARTIFICIAL FISH LURE

John Harvey Johnson, Corpus Christi, Tex., assignor to John Nelson, doing business as Louis Johnson Company, Chicago, Ill.

Application December 14, 1936, Serial No. 115,876

1 Claim. (Cl. 43—39)

My invention relates to fish lures, and more particularly to those employing a spoon to facilitate forward travel in a substantially level course, and my main object is to provide a lure of this type which is equipped with simple means for guarding against weeds and attracting attention.

A further object of the invention is to incorporate a simple and direct attaching means from the line to the spoon.

A still further object of the invention is to extend the spoon with a simple and effective weed guard.

Another object of the invention is to carry a buck tail by means of a novel bracket or support from the spoon.

An additional object of the invention is to provide a removable connection for the buck tail, in order that the latter may be removed or replaced when desired.

An important object of the invention is to design the novel lure along lines of compactness and simplicity, whereby it may be easy to handle and use as well as economical to manufacture.

With the above objects in view, and any others which may suggest themselves from the description to follow, a better understanding of the invention may be had by reference to the accompanying drawing, in which—

Figure 1 is a top plan view of the novel fish lure;

Fig. 2 is a side elevation thereof;

Fig. 3 is a bottom plan view;

Fig. 4 is a cross-section taken on line 4—4 of Fig. 1; and

Figure 5 is an enlarged section on the line 5—5 of Figure 1.

While an extensive variety of fish lures of the spoon type has been developed in late years, many of the devices are either complicated or cumbersome, or so designed that their manufacture is comparatively expensive. Owing to the fact that price is an important item in the marketing of devices of this kind, expediency dictates that they be produced along lines of utmost simplicity without sacrificing efficiency of operation.

In accordance with the foregoing, specific reference to the drawing indicates the spoon of the novel fish lure at 10. This spoon is of the conventional oval form, and is perforated at 10a to receive a ring 11 for the connection of a typical hook 12 at the rear.

While it is customary to attach a spoon to the line by swivel connections, I find that this adds expense without particular utility. I therefore built up the frontal tip 10b of the spoon with a thickened portion 10c from which extends a wire loop 13. The thickened portion 10c is formed in any suitable manner. Figures 2 and 5 show that a leg 13a of the loop 13 passes through the thickened portion of the spoon while the other leg 13b of the loop terminates within said thickened portion. The leg 13a extends outwardly and rearwardly to form a weed guard 14, to be described later. The line (not shown) is directly attached to this loop, and will permit the spoon to assume its wabbling or wiggling action during its course through the water without the need of a swivel.

Buck tails have been used for purposes of attraction in connection with fish lures, usually being attached directly to the spoon or base of the device. This requires a special formation or addition which I eliminate by combining the support of the buck tail with another item of importance. Thus, one leg 13a of the loop 13 is extended rearwardly in the form of a gradually rising wire 14 which has a hump 14a and continues rearwardly with a slight inward incline to the point where the buck tail 16 is to be attached. Here the wire is formed with a return loop 14b terminating in a hook 14c which engages the main portion of the wire. The ring 15 forming the head of the buck tail is linked to the loop 14b as clearly shown in Fig. 1, yet this loop may be unhooked if desired to render the buck tail removable in case it has suffered injury or wear, or if its use is not wanted.

It will be seen that, by constructing the novel fish lure as described, I have eliminated involvements or special formations of the spoon 10. The enlargement 10c is the only development thereof for attaching purposes, the balance of the spoon only requiring an opening 10a at the rear for the attachment of the hook. On the other hand, four features are connected to the spoon by the frontal enlargement. These are the loop 13 for the line connection, the hump 14a to serve as a weed guard, the loop 14b to link the buck tail, and the hook 14c to make the same removable. All of these features extend from the same source and piece of wire, so that when the latter has once been secured to the spoon, the article is complete. Obviously, the attachment for the spoon is simply formed from a single piece of wire, and quickly united with the spoon by forming a solder joint. It is evident that the novel fish lure may be economically produced and cheaply sold.

While I have described the invention along specific lines, the same is susceptible of various minor changes and refinements, and I consider all such changes and refinements as coming within the scope and spirit of the appended claim.

I claim:—

A fish lure, comprising a spoon, a thickened portion on the forward end of said spoon, and a wire loop rigidly attached to said thickened portion and extending outwardly beyond the front end of said spoon to provide the sole means for the attachment of a fishing line to said spoon, a portion of said loop extending through said thickened portion and rearwardly over said spoon to provide a weed guard, the portion of said wire extending rearwardly over the spoon being in contact with said spoon only at the place where it extends through said thickened portion.

JOHN HARVEY JOHNSON.